United States Patent
Shaw et al.

(10) Patent No.: US 6,259,455 B1
(45) Date of Patent: *Jul. 10, 2001

(54) METHOD AND APPARATUS FOR APPLYING SPECULAR HIGHLIGHTING WITH SPECULAR COMPONENTS INCLUDED WITH TEXTURE MAPS

(75) Inventors: Christopher W. Shaw, Pflugerville; Goran Devic; Evan T. Leland, both of Austin, all of TX (US)

(73) Assignee: Cirrus Logic, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,788

(22) Filed: Jun. 30, 1998

(51) Int. Cl.[7] .................................................. G06T 7/40
(52) U.S. Cl. ......................... 345/430; 345/426; 345/431; 345/428; 345/429
(58) Field of Search ................................. 345/430, 431, 345/429, 426, 428

(56) References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,097,427 | 3/1992 | Lathrop et al. | 395/130 |
| 5,126,726 | 6/1992 | Howard et al. | 340/728 |
| 5,185,856 | * 2/1993 | Alcorn et al. | 395/130 |
| 5,187,754 | 2/1993 | Currin et al. | 382/54 |
| 5,191,642 | 3/1993 | Quick et al. | 395/127 |
| 5,230,039 | 7/1993 | Grossman et al. | 395/130 |
| 5,268,996 | 12/1993 | Steiner et al. | 395/126 |

(List continued on next page.)

FOREIGN PATENT DOCUMENTS 9636011    11/1996    (WO) .

*Primary Examiner*—Matthew Luu
*Assistant Examiner*—Daniel J Chung
(74) *Attorney, Agent, or Firm*—Jonathan M. Harris; Steven Lin

(57) ABSTRACT

A graphics processor is disclosed that renders polygons with specular highlighting (glare) based on specular fractional values included in a texture map as components of each texel in the texture map. Each texel in the texture map includes red, green, and blue color values and the specular fractional component. The specular fractional component determines the proportion or percentage of a specular color value that is to be combined with the texel color values. The graphics processor preferably comprises a texture map engine that includes multiplier logic and adder logic. The texture map engine receives three values preferably from a video memory device—the texel color value, the specular fractional component value, and the specular color value. The multiplier multiplies the specular fraction by the specular color value and the resulting product is added to the texel color value. The output value from the adder is then used to render a screen pixel or is provided to another lighting stage. The result is that the texture map itself can influence how much specular highlighting is applied to an object on the screen.

19 Claims, 5 Drawing Sheets

U.S. PATENT DOCUMENTS

| | | | |
|---|---|---|---|
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,459,823 | 10/1995 | Silverbrook et al. | 395/131 |
| 5,673,374 * | 9/1997 | Sakaibara et al. | 395/126 |
| 5,710,876 | 1/1998 | Peercy et al. | 395/126 |
| 5,847,717 * | 12/1998 | Berry | 345/506 |
| 5,854,632 * | 12/1998 | Steiner | 395/426 |
| 6,054,993 * | 4/2000 | Devic et al. | 345/426 |
| 6,118,452 * | 9/2000 | Gannett | 345/418 |

* cited by examiner

METHOD AND APPARATUS FOR APPLYING SPECULAR HIGHLIGHTING WITH SPECULAR COMPONENTS INCLUDED WITH TEXTURE MAPS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a graphics system for a personal computer. More particularly, the present invention relates to a method and apparatus for applying specular highlighting to pixels on a computer display. Still more particularly, the present invention relates to an improved method of applying specular highlighting with specular components included with texture maps.

2. Background of the Invention

Sophisticated graphics packages have been used for some time in expensive computer aided drafting, design and simulation systems. Increased capabilities of graphic controllers and display systems, combined with standardized graphics languages, have made complex graphics functions available in even the most routine applications. For example, word processors, spread sheets and desktop publishing packages now include relatively sophisticated graphics capabilities. Three-dimensional (3D) displays have become common in games, animation, and multimedia communication and drawing packages.

The availability of sophisticated graphics in PC's has driven a demand for even greater graphic capabilities. To obtain these capabilities, graphic systems must be capable of performing more sophisticated functions in less time to process greater amounts of graphical data required by modern software applications. In particular, there is a continuing need for improvements in software algorithms and hardware implementations to draw three-dimensional objects using full color, shading, texture mapping, and transparency blending.

The development of raster display systems has dramatically reduced the overall cost and increased the capabilities of graphic systems. In a raster display system, a set of orthogonal or horizontal scan lines, each comprising a row of pixels, forms an array or grid of pixels to represent the entire screen area. The screen preferably comprises a cathode ray tube (CRT), LCD display, or the like, capable of scanning the entire pixel grid at a relatively high rate to reduce flicker. The pixel data preferably is stored in a frame buffer comprising dynamic random access memories (DRAMs), or more preferably video RAM's (VRAMs), where each pixel is represented by one or more bits depending upon the desired resolution In many graphics systems, for example, each pixel is drawn or "rendered" with 24 bits of color information (8 bits for red, 8 bits for green, 8 bits for blue). Typical display systems are capable of drawing screens with multiple colors at a variety of screen resolutions, including resolutions of 640 pixels×480 pixels, 800×600, 1024×768, 1280×1024, or even higher pixel value combinations, depending upon the software drivers and the hardware used.

Typically, a video controller scans and converts the pixel data in the frame buffer to provide control signals for the screen system. In particular, the video controller renders the screen pixels, typically from the top of the screen to the bottom and from left to right, converting pixel data into color intensity values for each pixel. In a color graphics system using a CRT, three separate beams are controlled for each of the primary colors, where the intensity of each of the beams is determined by the pixel value corresponding to the respective colors. A similar system is used for LCD displays.

Other improvements have been made in the hardware realm. Graphics processors and accelerators are available with software drivers that interface the host central processing unit (CPU) to the graphics processor. In general, objects to be drawn on the screen are represented by one or more polygons. Each polygon is further represented by one or more triangles. The software driver receives information for drawing the triangles on the screen, calculates certain basic parameters associated with the triangles and provides these parameters to the graphics processor. The software driver then sends a command for the graphics processor to draw the triangle into the frame buffer. A graphics processor may use interpolation techniques in which the fundamental information for the triangle to be drawn comprises a set of initial and incremental parameters. The graphics processor loads or otherwise receives the initial parameters for rendering a first pixel, and then interpolates the remaining pixels in a triangle by using the incremented parameters until the triangle is complete.

Graphics processors, such as the GD5464 manufactured by Cirrus Logic, are capable of applying texture to polygons through a process referred to as texture mapping. Texture mapping techniques generally apply a bitmap texture image to a polygon on the screen. A texture map typically is a two dimensional array of texture elements ("texels") that define a texture such as a brick, a carpet design, the grain of wood or any other texture that might be applied to an object on a computer screen.

In addition to texture, a graphics processor may apply glare, or specular highlight, to an object. In FIG. 1, for example, the front wall 20 of a jail cell includes numerous vertical bars 22 and one or more horizontal bars 24, as well as a door 21. Each bar typically is drawn to give the appearance of metal. To enhance the realism of the metallic surface of the bars 22, the bars are drawn to create the appearance of light reflecting off the bars by adding a specular component to the texel color values of the bars. The resulting appearance is that of "glare" from the surface of the metal bars. Many graphics processors create specular highlighting by adding a white color component, or some other appropriate color, to tem texel value to be applied to pixels on bars 22, 24. Further, the amount of specular highlighting can be varied by varying the intensity of the specular component applied to a particular texel value.

The glare created by light reflecting off of the surface of a physical object is, at least in part a function of the type of material comprising the object. For instance, a metal object results in more glare than a dark wood surface or even a metal surface that is covered with dirt. To provide a more realistic appearance of the surface of an object on which light is reflected in a computer system, the computer's graphics system should apply specular highlighting to the pixels of an object taking into account the type of texture applied to the surface of the object. Generally, a larger specular component should be applied to a polygon on which a texture map representing a glossy, metallic surface is applied than if the object's texture map represented a surface that reflects light poorly.

It thus would be beneficial to have a computer graphics system that can apply specular highlighting to pixels based on the type of texture applied to the pixels. Such a graphics system should be able to adjust the amount of specular highlighting applied to an object on the computer display depending on the particular texture map applied to the object. A graphics system that incorporates such a feature would increase the realism of the appearance of the displayed object. Despite the advantages such a system would offer, no graphics system that solves this problem is known to exist.

BRIEF SUMMARY OF THE INVENTION

The problems outlined above are in large part solved by a graphics processor that renders polygons with specular highlighting (glare) based on specular fractional values included in a texture map as components of each texel in the texture map. Accordingly, each texel in the texture map includes red, green, and blue color values and the specular fractional component. The specular fractional component determines the proportion or percentage of a specular color value that is to be combined with the texel color values.

The graphics processor preferably comprises a texture map engine that includes multiplier logic and adder logic. The texture map engine receives three values preferably from a video memory device—the texel color value, the specular fractional component value, and the specular color value. The multiplier multiplies the specular fraction by the specular color value and the resulting product is added to the texel color value by the adder. The output value from the adder is then used to render a screen pixel. The result is that the texture map itself can influence how much specular highlighting is applied to an object on the screen.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 3:
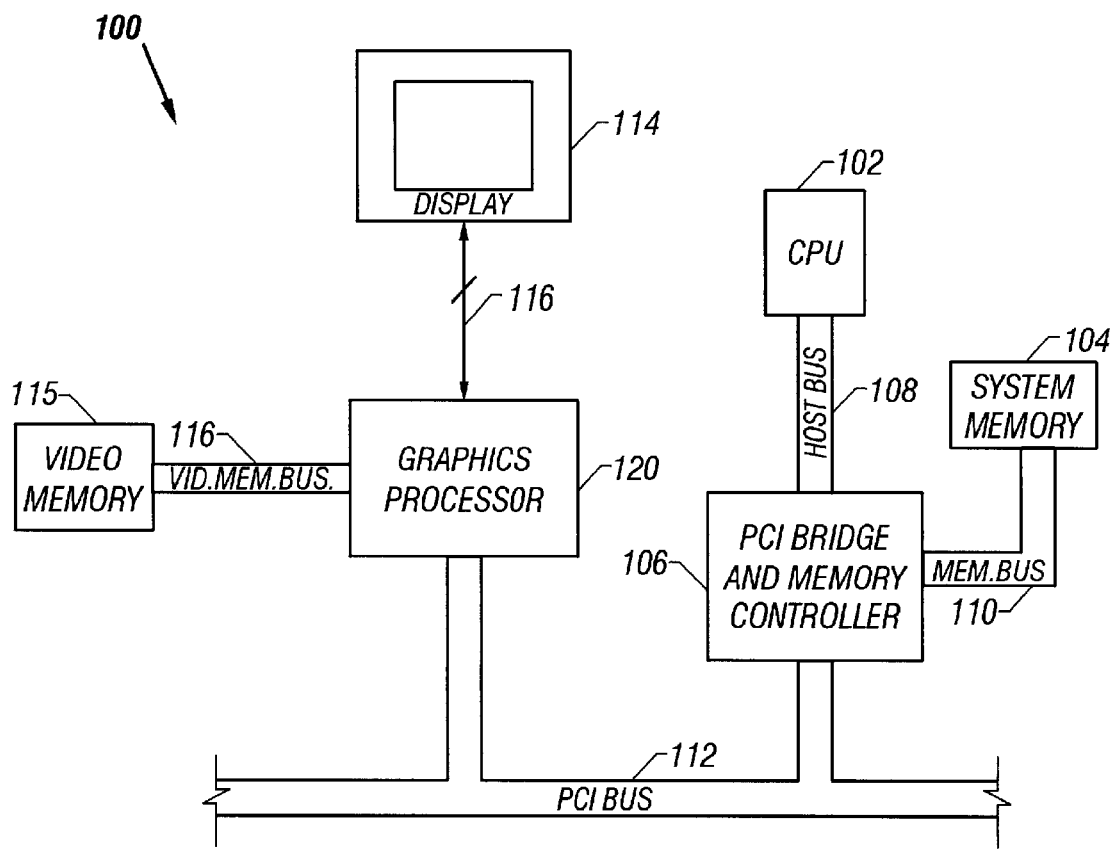
FIG. 3 shows a block diagram of the graphics system including a graphics processor in accordance with the prefer embodiment.

Referring now to FIG. 3, a computer system 100 constructed in accordance with the preferred embodiment generally includes a CPU 102, a system memory 104, a peripheral computer interconnect ("PCI") bridge and memory controller 106, a graphics processor 120, a display 114, and a video memory 115. The CPU 102, system memory 104, PCI bridge 106, display 114, and video memory 115 preferably are known components. Thus, for example, the CPU 102 may include any available processor such as the Pentium Pro®, K6®, or any other processor capable of operating a computer system in a fashion consistent with the preferred embodiment. The system memory 104 preferably includes standard dynamic random access memory ("DRAM"), synchronous DRAM (SDRAM), or any other suitable type of memory. The PCI bridge and memory controller may include any suitable off-the-shelf device or may be a custom design. Display 114 includes standard cathode ray tube ("CRT") displays, flat panel displays, or any other display device capable of displaying graphics. The video memory 116 preferably comprises any suitable type of memory, such as DRAM, for storing texture maps and other graphics related data It should be recognized that the architecture depicted in FIG. 3 is merely illustrative of one embodiment of the invention and that numerous other architectures are also possible and are considered as part of in the invention. In addition, certain terms are used throughout the following description and claims to refer to particular system components. As one skilled in the art will appreciate, computer and graphics processor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Referring still to FIG. 3, the CPU 102 connects to the PCI bridge and memory controller 106 via a host bus 108 which includes address, data, and control lines for transferring data. The PCI bridge and memory controller 106 also connects to system memory 110 via a memory bus 110 which also includes address, data, and control lines suitable for transferring data between system memory 104 and PCI bridge and memory controller 108. The CPU 102 may initiate read and write cycles to system memory 104 by way of host bus 108, PCI bridge and memory controller 106, and memory bus 110 according to known techniques.

A system bus 112, preferably comprising a PCI bus (although other bus architectures are also acceptable) connects the PCI bridge and memory controller 106 to graphics processor 120. It should be recognized by those of ordinary skill in the art that other devices besides those shown in FIG. 3 may also connect to the PCM bus 112. Examples of other devices include extended memory cards, video cards, and network cards. Graphics data in the form of a display list is transferred between CPU 102 and graphics processor 120 by way of host bus 108, PCI bridge and memory controller 106, and PCI bus 112. Once graphics data is received by the graphics processor 120 over the PCI bus 112, the graphics processor manipulates the data to provide appropriate signals over lines 116 to display 114 for displaying objects on the display.

The video memory 115 couples to the graphics processor 120 by way of a video memory bus 116. The video memory bus 116 may comprise any suitable bus architecture, such as the commonly known RAMBUS architecture. Texture maps preferably are stored in video memory 115 and are provided to the graphics processor 120 over the video memory bus 116. Alternatively, texture maps can be stored in system memory 104 and conveyed to the graphics processor 120 by way of the PCI bridge and memory controller 106 and PCI bus 112.

In accordance with the preferred embodiment, each texture element ("texel") in a texture map comprises at least four component values—a red color component, a blue color component, a green color component, and a specular fractional component. Additional components can be associated with each texel, if desired. The graphics processor 120 combines these four components (red, green, blue, and specular fraction) with a specular color value also preferably stored in video memory 115 to render a screen pixel using the preferred apparatus described below with respect to FIG. 7. In short, specular highlighting is applied to each pixel of a polygon using a specular color value in conjunction with a specular fractional component of a texel in a texture map. Including a specular fractional component in a texture map permits the graphics processor to apply specular highlighting to a screen object while taking into account the particular type of texture map desired. As a result objects with more realistic appearances are made possible.

Figure 4:
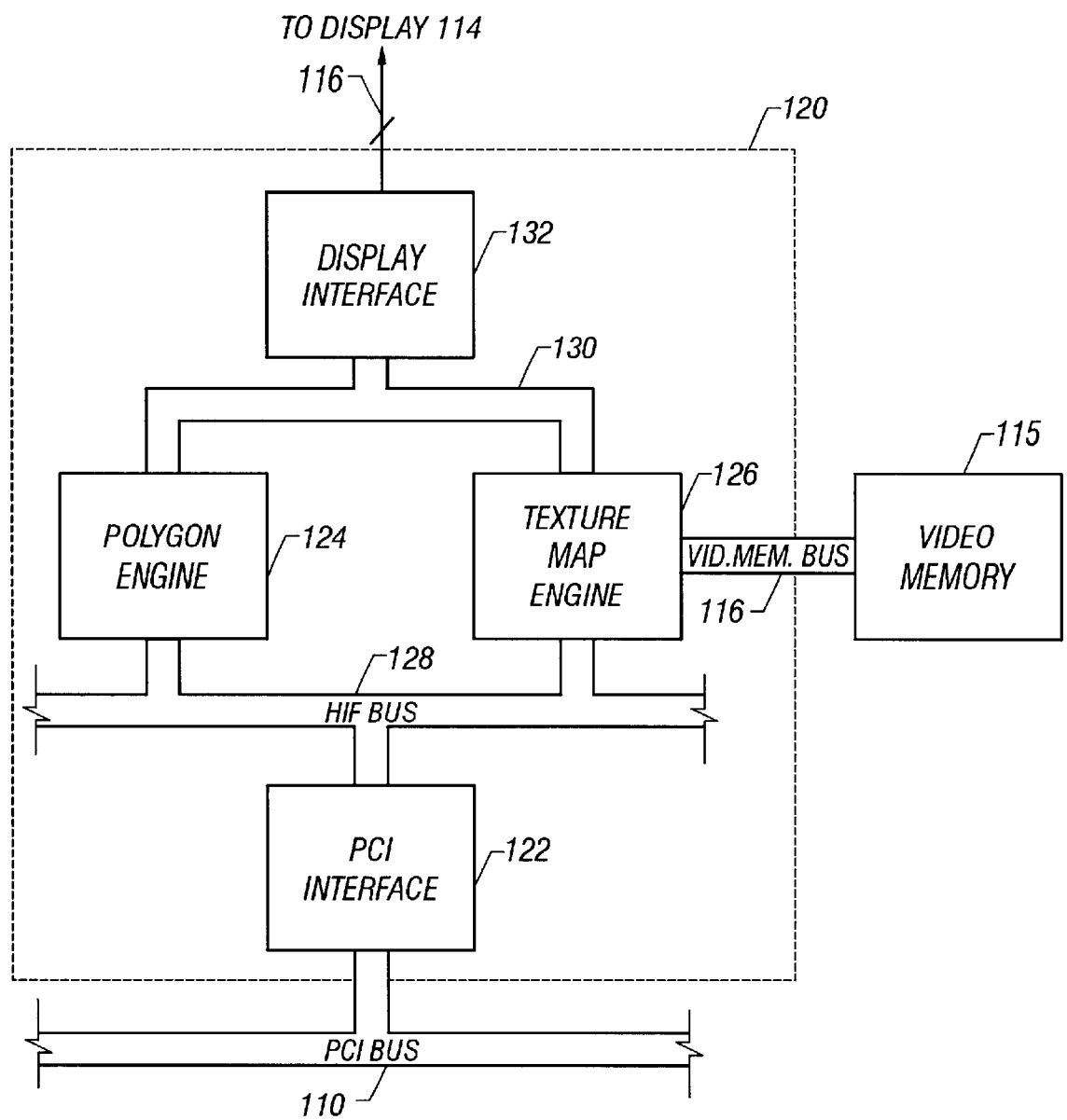
FIG. 4 is a block diagram of the graphics processor of FIG. 3 including a texture map engine in accordance with the preferred embodiment.

Referring now to FIG. 4, the graphics processor 120 of the preferred embodiment includes a PCI interface 122, a polygon engine 124, a tete map engine 126, and a display interface 132. The PCI interface 122, polygon engine 124, and texture map engine 126 couple together via bus 128 which preferably comprises a host interface (HIF) bus. The polygon engine 124 and the texture map engine 126 couple to the display interface 132 via bus 130. The display interface 132 uses the information provided to it from the polygon engine 124 and the texture map engine 126 to provide appropriate signals to display 114 over lines 116 for displaying images. The video memory 115 preferably connects to the texture map engine 126 via the video memory bus 116 although any configuration for coupling the video memory to the texture map engine is acceptable as well.

In accordance with the preferred embodiment, graphics processor 120 receives data in the form of a display list from the CPU 102 or system memory 104 via the PCI bus 112. The display list is stored in a register file in graphics processor 120 or memory (not shown) directly coupled to the graphics processor 120. The display list includes information needed to render a polygon. As explained in greater detail below, some of the values from the display list are used by the polygon engine 124 and some values are used by the texture map engine 126. It is assumed for purposes of the following discussion that each polygon includes an upper or main triangle (such as triangle 47 in FIG. 5 described in more detail below) abutting a lower or opposite triangle (such as triangle 49). The values in the display list include the data needed to render both upper and lower triangles. Table I below includes an exemplary display list identifying the values that are included in the list (first column of Table I) and the description of each value (second column). References to X and Y values refer to the xy coordinates of pixels on the display (referred to as x,y pixel space). References to U and V values refer to the coordinaes of texels in a texture map which are identified as u,v coordinates. The u,v coordinate system of a texure map is referred to as u,v texture map space. Further, the "SPEC" values are used to generate the specular color values for providing specular highlighting to the screen pixels.

TABLE I

Display List.

| NAME | DESCRIPTION |
|---|---|
| X | Initial x pixel coordinate |
| Y | Initial y pixel coordinate |
| R | Initial Red value for initial x, y pixel |
| G | Initial Green value for initial x, y pixel |
| B | Initial Blue value for initial x, y pixel |
| ΔX MAIN | Main slope value: this value is added to the initial x coordinate on each step in y to generate the x starting point for each new ORTHO scan line. |
| Y COUNT | Top count: Bottom count concatenated. Determine the number of steps in y for the upper and lower portions of the triangle drawn. |
| X WIDTH MAIN | Initial upper width value. Width of the first ORTHO scan line in x of the upper (main) triangle |
| X WIDTH OPP | Initial bottom width value. Width of the first ORTHO scan line in x of the lower (opposite) triangle |
| ΔX WIDTH MAIN | Main width slope. This vlaue is the amount by which the width of each scan line in x of the upper (main) traingle is adjusted on each step in y. |
| ΔX WIDTH OPP | Opposite width slope. This value is the amount by which the width of each scan line in x of the lower (opposite) triangle is adjusted on each step y. |
| ΔR MAIN | Red main slope. This value is the amount by which the red color component start value for each scan line in x is adjusted on each step in y. |
| ΔG MAIN | Green main slope. This value is the amount by which the green color component start value for each scan line in x is adjusted on each step in y. |
| ΔB MAIN | Blue main slope. This value os the amount by which the blue color component start value for each scan line in x is adjusted on each step in y. |
| ΔR ORTHO | Red ORTHO slope. This vlaue is the amount by which the red color component is adjusted for each step in x along a scan line. |
| ΔG ORTHO | Green ORTHO slope. This value is the amount by which the green color component is adjusted for each step in x along a scan line. |
| ΔB ORTHO | Blue ORTHO slope, This value is the amount by which the blue color component is adjusted for each step in x along a scan line. |
| Z | Initial z pixel coordinate. |
| ΔZ MAIN | Z main slope value. Added to z to generate starting z coordinate for each new scan line. |
| ΔZ ORTHO | Z ORTHO value. This value is the amount by which the z coordinate is adjusted along a scan line on each step in x. |
| V | Initial v coordinate of first texel address in texture map being used. |
| U | Initial u coordinate of first texel address in texture map being used. |
| ΔV MAIN | V main slope value, Amount by which the v texel coordinate start value is adjusted on each step in y. |
| ΔU MAIN | U main slope value. Amount by which the u texel coordinate start value is adjusted on each step in y. |
| ΔV ORTHO | V ORTHO slope value. Amount by which the v texel coordinate is adjusted on each step in x. |
| ΔU ORTHO | U ORTHO slope value. Amount by which the u texel coordinate is adjusted on each step in x. |
| R SPEC | Initial red specular value. |
| G SPEC | Initial green specular value. |
| B SPEC | Initial blue specular value. |
| ΔR SPEC MAIN | Red main delta value |
| ΔG SPEC MAIN | Green main delta value |
| ΔB SPEC MAIN | Blue main delta value |
| R SPEC ORTHO | Red Ortho delta value |
| G SPEC ORTHO | Green Ortho delta value |
| B SPEC ORTHO | Blue Ortho delta value |

It should be recognized that a display list may, and often will, include additional values such as second order u and v slope values used for providing perspective when applying a texture map to a polygon. Thus, the values in the display list of Table I are exemplary only and are not exhaustive of all the values included in a typical display list.

The graphics processor 120 uses the values in the display list in Table I to render a polygon. Rendering a polygon with texture and specular highlighting generally involves (1) calculating x,y pixel coordinates, (2) selecting or computing texel color values from a texture map; and (3) combining the texel color value with an appropriate specular color value. In accordance with the preferred embodiment, graphics processor 120 also applies a specular color value to the texel color value before rendering the pixel. The manner in which the graphics processor 120 renders a textured polygon will now be described with reference to FIGS. 5–7 and Table I. First, the process for calculating x,y pixel coordinates will be described with reference to FIG. 5. This process is performed preferably by polygon engine 124. Then the process for calculating u)v texel coordinates, preferably performed by texture map engine 126, will be discussed with reference to FIG. 6. Finally, the process for applying specular highlighting in accordance with the preferred embodiment will be described with reference to FIG. 7. This last process preferably is performed also by the texture map engine.

Figure 5:
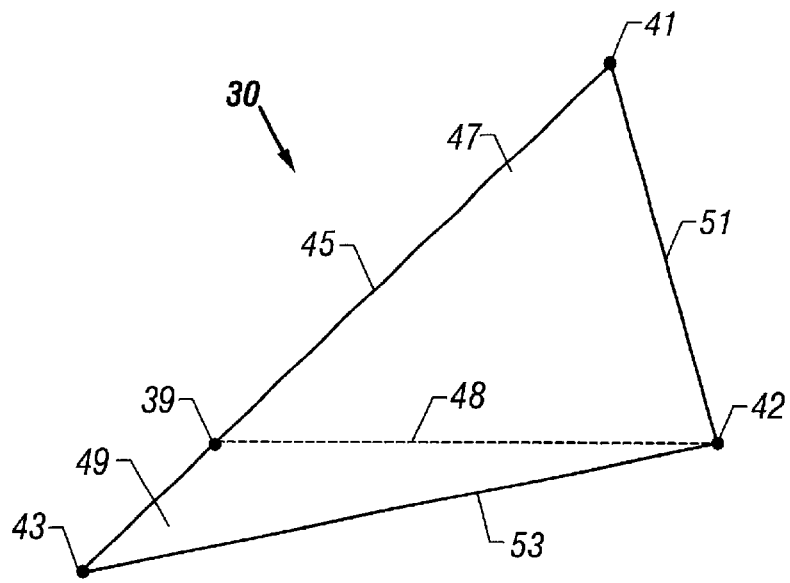
FIG. 5 shows an exemplary triangle used to represent objects by the graphics processor of FIG. 4.

A typical polygon 30 is shown in FIG. 5. The polygon 30 preferably is divided into two portions—an upper or main triangle 47 and a lower or opposite triangle 49 separated from main triangle 47 by horizontal dashed line 48. In general, however, a polygon is subdivided into as many triangles as are necessary to represent the polygon For example, ten thousand triangles or more may be required to create a realistic looking image of a human face. Graphics objects typically are represented with a collection of triangles because, as explained below, triangles are simple geometric shapes that can be characterized with relatively few values and the three vertex points that define a triangle will always lie within a single plane which is easy to interpolate in a digital system.

Referring still to FIG. 5, polygon 30 may be drawn as two triangles, such as triangles 47, 49. To render triangles 47, 49, for example, a software driver receives vertex information (including x, y coordinates of each vertex 41, 42, 43) and identifies a main slope line 45 extending the vertical length (in the y direction) of polygon 30 between vertices 41 and 43. The other two sides 51, 53 of triangle 40 are referred to as opposite slopes. The x,y coordinates of polygon 30 are interpolated by engine 124 using orthogonal (ORTHO) horizontal scan lines of pixels that extend from the main slope 45 to the opposite edges 51, 53. The vertical or y parameter is used as a reference coordinate, so that they pixel value preferably is incremented (or decremented depending on whether the triangle is rendered from top to bottom or bottom to top) by one for each scan line, A value for the main slope 45 is calculated as an initial condition and is used to compute the x coordinate of the first pixel in each scan line (i.e., the pixels on the main slope). Initial and incremental width values are determined for the scan lines and the polygon engine 124 interpolates the width rather than edge walking the opposite slopes. The interpolated width value is loaded into a counter and decremented for each pixel in the current scan line. When the width counter becomes zero or otherwise reaches terminal count, the counter asserts a terminal count signal indicating that the scan line is complete. Using such interpolation techniques, each triangle 47, 49 is drawn one row or horizontal scan line of pixels at a time. For each scan line, pixels are rendered from the main slope 45 to the opposite edges 51, 53.

Figure 1:
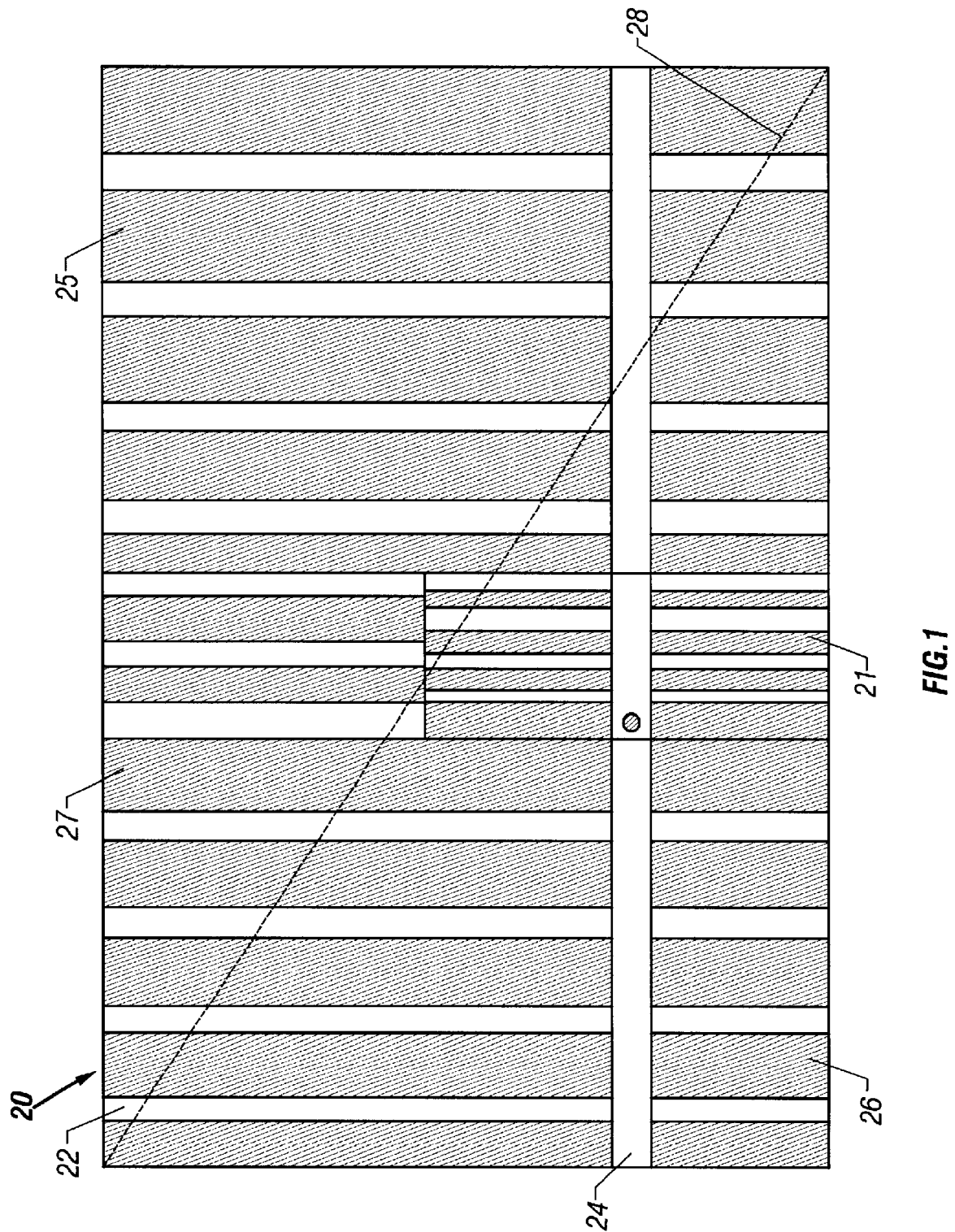
FIG. 1 shows an exemplary image of a jail cell wall including multiple metal bars.
Figure 2:
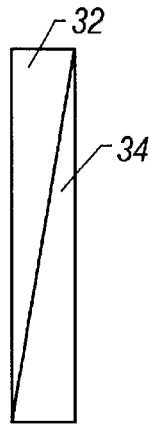
FIG. 2 shows a single metal bar of FIG. 1 represented by two triangles on which glare, specular highlighting is applied.

For purposes of simplicity, the following discussion assumes the polygon 30 is rendered from top to bottom. Polygon 30 is drawn in a series of horizontal ORTHO scan lines in which each scan line includes one or more pixels. Because the ORTHO scan lines are horizontal, only the x coordinate changes from one pixel in the scan line to the next. Further, the polygon engine 124 preferably increments the x coordinate by one as the graphics processor renders each pixel in succession along an ORTHO scan line. To draw the upper or main triangle 47, the graphics processor needs to know or calculate the coordinate of the first pixel in the triangle (pixel 41, for example), the coordinate of the first pixel in each ORTHO scan line, the number of pixels in each scan line, and the number of scan lines in the triangle as described above. These values can be determined from the values in the display list of Table I. The coordinate of the initial pixel is X.Y. The polygon engine 126 calculates the coordinate of the first pixel in each successive scan line by adding $\Delta X$ MAIN to X. It should be recognized that $\Delta X$ MAIN may be a positive or negative number depending on the slope of the line on which the first pixels in each ORTHO scan line lie. Thus, if the line on which the first pixels in each scan line lie slopes down and to the left (as is the case for the main slope line 45 in FIG. 1), then $\Delta X$ MAIN is a negative number because the x,y coordinate axes in the preferred embodiment have x coordinates increasing from left to right (y coordinates increase from the top of the display to the bottom). Thus, adding a negative value to an x coordinate produces an x coordinate to left on the display. Conversely, if the line on which the first pixels lie slopes down and to the right, $\Delta X$ MAIN will be a positive number. If the line is vertical, $\Delta X$ MAIN has a value of 0.

The polygon engine 124 calculates the number of pixels in each ORTHO scan line by adding $\Delta X$ WIDTH MAIN to the width (i.e., number of pixels in the x direction) of the previous scan line. The number of scan lines in a triangle is provided by the Y COUNT value which includes the number of scan lines in both the upper (main) triangle and lower (opposite) triangle. The portion of the Y COUNT value representing the number of scan lines in the main triangle preferably is loaded into a counter and decremented by one for each ORTHO scan line drawn. When the counter reaches its terminal count, the polygon engine has completed calculating pixel coordinates for the main triangle.

After the main triangle 47 of FIG. 5 is drawn, the polygon engine 124 calculates pixel coordinates for the opposite triangle 49 using substantially the same technique. The first pixel to be drawn preferably is pixel 39 and the width of the first scan line is the number of pixels along dashed line 48.

In accordance with the preferred embodiment, the texture map engine 126 calculates u,v texel coordinates which in turn are used to select or calculate texel color values. The texture map engine 126 preferably determines uv texel coordinates as the polygon engine 124 computes each pixel coordinate. Alternatively, the texture map engine may determine the u,v texel coordinates after all the pixel coordinates are calculated by the polygon engine 124. The texels are stored in a texture map and are accessed using values in the display list in Table I above. It should be apparent that in x,y pixel space, polygons are drawn by providing color values to each and every pixel in an ORTHO scan line, incrementing they coordinate to the next scan line and repeating the process. The following discussion describes how the u,v texel coordinates are calculated using the display list of Table 1.

Unlike calculating pixel coordinates in which only the x coordinate changes from one pixel to the next along an ORTHO scan line in x,y pixel space, both the u and v coordinates may change from one texel to the next along a single ORTHO scan line in u,v texture space. The U and V values from Table I provide the coordinate of the fit texel to be used from the texture map. The ΔU ORTHO and ΔV ORTHO values are used by the texture map engine 126 to calculate the u,v coordinate for each texel along an ORTHO scan line. The ΔU MAIN and ΔV MAIN values are used to compute the u,v coordinate for the first texel in a particular ORTHO scan line.

Figure 6:
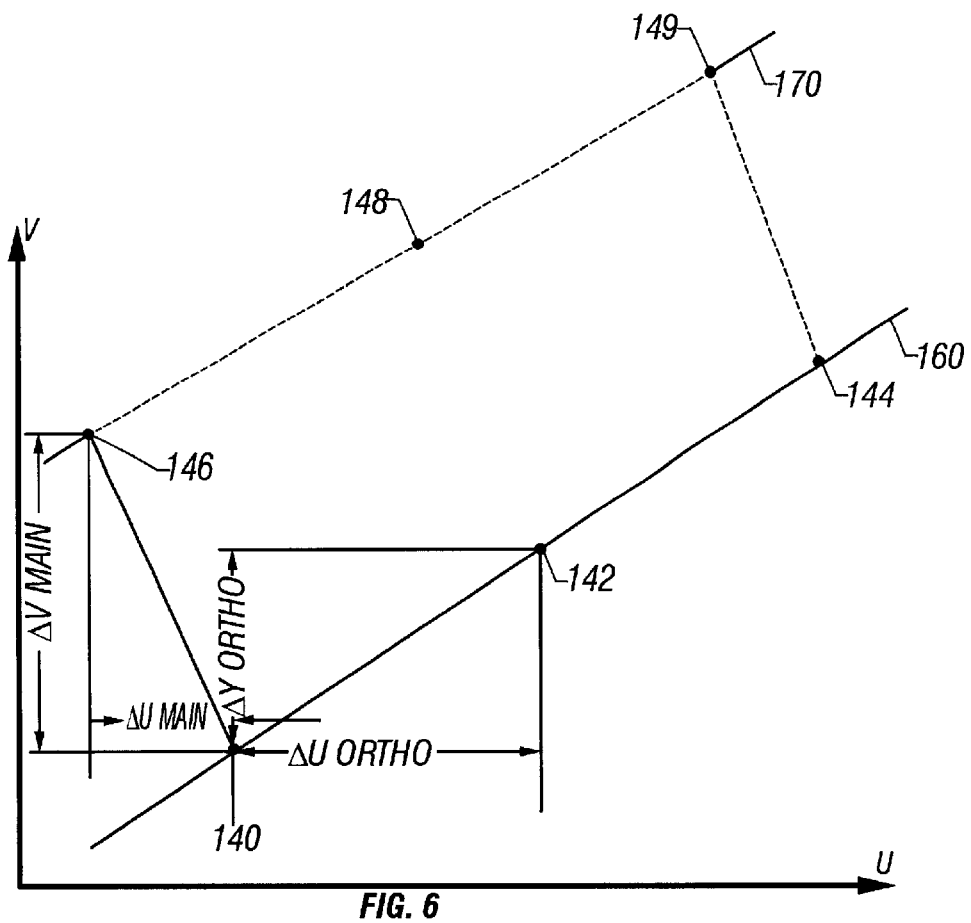
FIG. 6 depicts texture elements from a texture map used to render texture.

Referring now to FIG. 6, exemplary texels 140, 142, 144, 146, 148, 149 from a texture map are shown in relation to the u and v axes. Texels 140, 142, 144 are texels along ORTHO scan line 160 and texels 146, 148, 149 are texels along ORTHO scan line 170. Once the coordinate of texel 140 is determined by texture map engine 126, the u, v coordinate for texel 142 is calculated by adding the ΔU ORTHO and ΔV ORTHO values to the u, v coordinate of texel 140. The u, v coordinate of texel 144 is calculated in a similar fashion by adding the ΔU ORJTHO and ΔV ORTHO values to the u, v coordinate of texel 142. Once the coordinates of all of the texels along ORTHO scan line 160 have been determined, the first texel (texel 146) on the next scan line (scan line 170) is determined by adding the ΔU MAIN and ΔV MAIN values to the u,v coordinate of texel 140. Thus, texture map engine 126 must retain the u, v coordinate of the first texel in a scan line until the first texel in the next scan line is calculated.

Once a u,,v texel coordinate is calculated, the texture map engine uses the calculated coordinate to select a texel color value associated with the particular u,v coordinate from a desired texture map. It should be apparent to one of ordinary skill in the art that the calculated u,v coordinate may include integer and fractional components. The coordinates of texel in a texture map, however, include only integer values. Thus, the calculated u,v coordinates may not exactly coincide with an integer texture map coordinate. The preferred embodiment of the invention, therefore, implements any one of a variety of known techniques for selecting or calculating texel color values given a fractional u,v coordinate. For example, texture map engine 126 may implement "point sampling" (also referred to as "nearest neighbor" sampling) in which the texel color value of the nearest texel to the fractional, calculated u,v coordinate is selected. Alternatively, the texture map engine may implement "bi-linear filtering" in which the four nearest texel color values to the fractional, calculated u,v coordinate are averaged. Any other technique for selecting or calculating texel color values from a texture map given a u,v coordinate is also consistent with the preferred embodiment. As would be understood by one skilled in the art, each texel color value actually comprises three color values-red, green, and blue.

A similar method to that described above with respect to calculating u,v texel coordinates for determining texel color values is also used to select or calculate the specular color value for specular highlighting. As one of ordinary skill in the art would understand, this method uses the R SPEC, G SPEC, B SPEC, AR SPEC MAIN, AG SPEC MAIN, AB SPEC MAIN, R SPEC ORTHO, & SPEC ORTHO, and B SPEC ORTHO values from the display list of Table I. Alternatively, any other suitable technique for determining a specular color value can also be used. Once the texture map engine 126 selects or calculates a specular color value, the texture map engine combines a particular amount of the specular color value with the texel color value and the resulting combination is used to render the screen pixel. A specular fractional component of the texel determines the "amount" as explained below. By determining an "amount" of specular color it is meant that the specular color value is adjusted based on the specular fraction.

Thus, in accordance with the preferred embodiment, each texel in a texture map includes a specular fractional component value in addition to the red, green, and blue texel color values. Generally, the specular fractional component of a texel is used to determine the amount of the specular highlighting to be applied to a pixel rendered with the associated texel. The specular fractional component preferably spans a range of values indicating the amount of the specular color value to be applied to the pixel. The texture map engine 126 combines the specular color value with the texel color value based on the value of the specular fractional component. For example, the specular fractional component may include the range of values from 0 to 1. If the texture map engine 126 receives a specular fractional component of 0 from the texture map, the texture map engine does not apply any specular highlighting to the texel (i.e. 0 represents 0% specular highlighting). On the other hand, the texture map engine applies the full specular color value (i.e. 100%) to the texel if the specular factional component is 1. Any value of the specular fractional component between 0 and 1 preferably results in the texture map engine 126 applying a percentage of the specular color value to the texel. The particular percentage is based on the size of the specular fractional component value. Thus the texture map engine 126 will apply 50% of the specular color value to the texel for a specular fractional component value of 0.5. Alternatively, rather than span the range of values from 0 to 1, the specular fractional component may span a different range of values as long as the range of values determines the amount or percentage of the specular color value to be applied to the texel.

Figure 7:
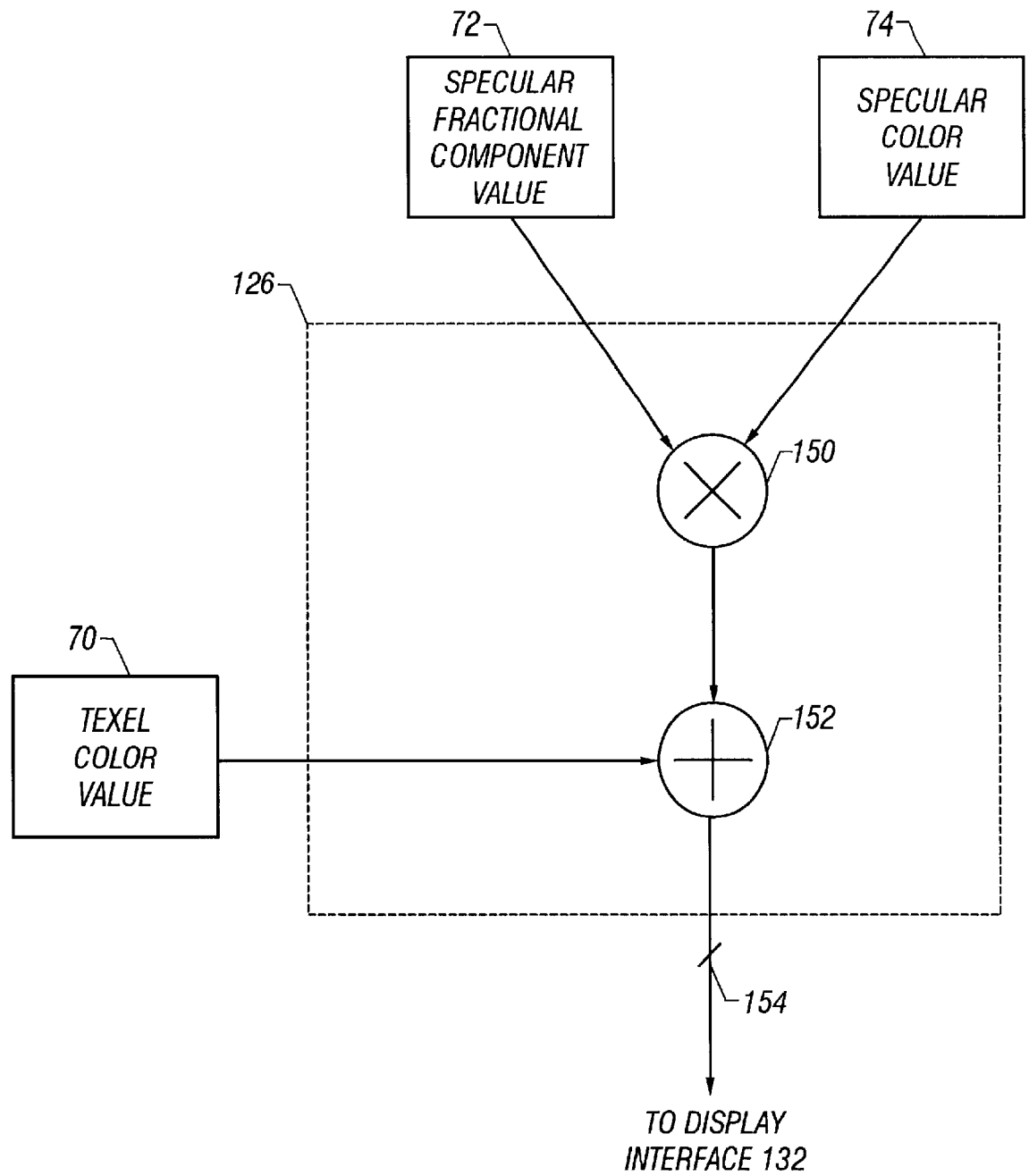
FIG. 7 shows a more detailed block diagram of the texture map engine of FIG. 4 including logic for calculating a proportion of a specular color value and then combining that proportion with a texel color value.

Referring now to FIG. 7, texture map engine 126 preferably includes multiplier logic 150 and adder logic 152. It should be recognized that other components are included in texture map engine 126, but are not shown for sake of clarity. Furthermore, the multiplier and adder logic components shown in FIG. 7 do not necessarily have to be included in texture map engine 126, but may be located elsewhere within the graphics processor 120.

The texture map engine 126 receives a texel color component value 70, a specular fractional component value 72, and a specular color value 74 and generates an output texel value on lines 154 to be applied to a screen pixel. The input values 70, 72, and 74 are preferably communicated to the texture map engine 126 over video memory bus 115 FIGS. 3 and 4). Although not shown, texture map engine 126 may include other processing logic for filtering the texel color values 70 and specular color values 74. Texture map engine 126 also may include logic (not shown) for fog alpha blending and other desired lighting operations. In accordance with the preferred embodiment, the multiplier 150 multiplies the specular fractional component 72 by the specular color value 74. The resulting product is then added to the texture color component 70 by adder 152. One of ordinary skill in the art will recognize other ways to combine the input values 70, 72, 74 other than, or in addition to multiplier 150 and adder 152. The output texel value from adder 154 represents the texel value 70 combined with an amount of specular color 74 determined by the specular fractional component 72 and is provided to the display interface 132 (FIG. 4) or other lighting logic (not shown) if included.

In this manner, texture map engine 126 combines a predetermined amount of specular highlighting The amount of the specular color value that is combined with the texel is determined by specular frictional components included in the texture map as components of each texel. Thus, each texture map can be defined to customize the amount of specular highlighting that is appropriate for that map. Moreover, applying specular highlighting in accordance with type of texture to be applied to an object will result in the object having a more realistic looking appearance.

Numerous variations and modifications will become apparent to those skilled in the art once the above disclosure is fully appreciated. It is intended that the following claims be interpreted to embrace all such variations and modifications.

What is claimed is:

1. A graphics processor for receiving parameters defining pixels in a polygon from a host processor and which is capable of rendering said pixels on a display with texel values provided from a texture map and combined with specular highlighting color values, comprising:
    a multiplier for multiplying a specular color value derived from a specular color determining technique by a specular fractional component of a texel for a polygon having texel values stored in a texture map to produce a specular product, wherein said specular fractional component is assigned to the texel based on a texture type applied to a surface of the polygon containing the texel, said specular fractional component is indicative of the amount of specular highlighting to be generated for the texel, and said specular fractional component is stored in said texture map; and
    an adder for adding said specular product to a texel color value to produce an output texel value used to render a pixel.

2. The graphics processor as in claim I wherein said graphics processor is adapted to be coupled to a video memory over a video bus, said video memory storing said specular color values, said specular fractional components, and said texel color values and said graphics processor reads said specular color values, said specular fractional components, and said texel color values from said video memory over said video bus.

3. The graphics processor as in claim 1 further including:
    an interface to a peripheral bus for coupling to said host processor;
    a texture map engine coupled to said peripheral bus interface and including said multiplier; and
    a display interface coupled to said texture map engine and adapted to couple to a display.

4. A computer system, comprising:
    a display comprising a grid of pixels;
    a host processor;
    a graphics processor coupled to said host processor by an expansion bus and to said display, wherein said graphics processor comprises a multiplier for multiplying a specular color value derived from a specular color determining technique by a specular fractional component of a texel for a polygon having texel values stored in a texture map to produce a specular product in which said specular fractional component is assigned to the texel based on a texture type applied to a surface of the polygon containing the texel, said specular fractional component is indicative of the amount of specular highlighting to be generated for the texel, and said specular fractional component is stored in said texture map and wherein said graphics processor further comprises an adder for adding said specular product to a texel color value to produce an output texel value used to render each of said pixels; and
    a video memory coupled to said graphics processor for storing said texture map and said specular fractional component.

5. The computer system of claim 4 wherein said graphics processor includes a texture map engine coupled to said video memory for combining said texel color values with specular color values also stored in said video memory based on said specular fractional components.

6. The computer system of claim 5 wherein said texture map engine includes multiplier logic for multiplying said specular fractional components by said specular color values to produce specular product values.

7. The computer system of claim 6 wherein said texture map engine also includes adder logic for adding said specular product values to said texel color values.

8. The computer system of claim 7 wherein said specular fractional component values are representative of values in the range from 0 to 1.

9. A computer graphics system, comprising:
    a display including a grid of pixels;
    a graphics processor coupled to said display for rendering said pixels, wherein said graphics processor has a texture map engine and said graphics processor comprises a multiplier for multiplying a specular color value derived from a specular color determining technique by a specular fractional component of a texel for a polygon having texel values stored in a texture map to produce a specular product in which said specular fractional components is assigned to the texel based on a texture type applied to a surface of the polygon containing the texel, said specular fractional component is indicative of the amount of specular highlighting to be generated for the texel, and said specular fractional component is stored in said texture map, and wherein said graphics processor further comprises an adder for adding said specular product to a texel color value to produce an output texel value used to render each of said pixels; and
    a video memory for storing texture maps and specular color values;
    wherein said texture maps each includes an array of said texel values, each of said texel values including a color component and said specular fractional component.

10. The computer graphics system of claim 9 wherein said texture map engine includes an adder for adding said texel color components to a fractional proportion of a specular color value, said specular fractional component determining said fractional proportion.

11. The computer graphics system of claim 10 wherein said texture map engine also includes a multiplier for multiplying said specular fractional component by said specular color value to generate said fractional proportion of said specular color value.

12. The computer graphics system of claim 11 wherein said specular fractional component values are representative of values in the range from 0 to 1.

13. A method for applying specular highlighting to a texel, comprising:
    (a) reading a texel color value for a texel from a texture map;
    (b) reading a specular fractional component from the texture map, wherein said specular fractional component is assigned to the texel based on a texture type applied to a polygonal surface containing the texel and said specular fractional component is indicative of the amount of specular highlighting to be generating for the texel;

(c) reading from a memory system a specular color value derived from a specular color determining technique;

(d) multiplying said specular fractional component and said specular color value to produce a specular output value; and (e) adding said specular output value with said texel color value to produce a texel value with a resulting amount of specular highlighting.

14. The method of claim 13 wherein step (d) includes multiplying said specular fractional component and said specular color value.

15. The method of claim 13 wherein step (e) includes adding said specular output value to said texel color value.

16. The graphics processor as in claim 1 wherein the specular color determining technique utilizes specular parameter values, which include at least an initial red specular value, an initial green specular value, an initial blue specular value, a red main delta value, a green main delta value, a blue main delta value, a red ortho delta value, a green ortho delta value, and a blue ortho delta value, for deriving said specular color value.

17. The computer system of claim 4 wherein the specular color determining technique utilizes specular parameter values, which include at least an initial red specular value, an initial green specular value, an initial blue specular value, a red main delta value, a green main delta value, a blue main delta value, a red ortho delta value, a green ortho delta value, and a blue ortho delta value, for deriving said specular color value.

18. The computer graphics system of claim 9 wherein the specular color determining technique utilizes specular parameter values, which include at least an initial red specular value, an initial green specular value, an initial blue specular value, a red main delta value, a green main delta value, a blue main delta value, a red ortho delta value, a green ortho delta value, and a blue ortho delta value, for deriving said specular color value.

19. The method of claim 13 further comprising the step of:

utilizing, by said specular color determining technique, specular parameter values, which includes at least an initial red specular value, an initial green specular value, an initial blue specular value, a red main delta value, a green main delta value, a blue main delta value, a red ortho delta value, a green ortho delta value, and a blue ortho delta value, for deriving said specular color value.

* * * * *